(12) United States Patent
Retsina

(10) Patent No.: US 7,103,452 B2
(45) Date of Patent: Sep. 5, 2006

(54) METHOD AND SYSTEM FOR TARGETING AND MONITORING THE ENERGY PERFORMANCE OF MANUFACTURING FACILITIES

(76) Inventor: Theodora Retsina, 56 17th St. N.E., Atlanta, GA (US) 30309

( * ) Notice: Subject to any disclaimer, the term of this patent is extended or adjusted under 35 U.S.C. 154(b) by 0 days.

(21) Appl. No.: 10/905,290

(22) Filed: Dec. 23, 2004

(65) Prior Publication Data

US 2005/0143953 A1 Jun. 30, 2005

Related U.S. Application Data

(60) Provisional application No. 60/532,456, filed on Dec. 29, 2003.

(51) Int. Cl.
*G06F 19/00* (2006.01)
(52) U.S. Cl. .................................. 700/291
(58) Field of Classification Search ............. 700/95, 700/96, 108, 174, 291; 702/182–186
See application file for complete search history.

(56) References Cited

U.S. PATENT DOCUMENTS

| | | | | |
|---|---|---|---|---|
| 5,781,432 A | * | 7/1998 | Keeler et al. | 700/44 |
| 5,825,646 A | * | 10/1998 | Keeler et al. | 700/44 |
| 6,169,981 B1 | * | 1/2001 | Werbos | 706/23 |
| 6,532,454 B1 | * | 3/2003 | Werbos | 706/14 |
| 6,556,951 B1 | * | 4/2003 | Deleo et al. | 702/183 |
| 6,839,599 B1 | * | 1/2005 | Martin et al. | 700/79 |
| 6,847,854 B1 | * | 1/2005 | Discenzo | 700/99 |
| 2002/0091972 A1 | * | 7/2002 | Harris et al. | 714/47 |
| 2003/0028265 A1 | * | 2/2003 | Martin | 700/31 |
| 2003/0061004 A1 | * | 3/2003 | Discenzo | 702/182 |
| 2004/0093107 A1 | * | 5/2004 | Good et al | 700/108 |
| 2004/0225649 A1 | * | 11/2004 | Yeo et al. | 707/3 |
| 2004/0267395 A1 | * | 12/2004 | Discenzo et al. | 700/99 |
| 2005/0034023 A1 | * | 2/2005 | Maturana et al. | 714/37 |

* cited by examiner

*Primary Examiner*—Maria N. Von Buhr

(57) ABSTRACT

An on-line neural network based software application that enables manufacturing facilities to meaningfully determine their energy performance, no matter how complex, with respect to the production rates and ambient conditions. This is achieved by the generation of three levels of targets; facility overall performance, departmental key performance indicators, and key operating parameters that impact the facility's energy consumption and over which, the operators have control. A unit and cost gap analysis of actual versus target is executed for overall and departmental energy performance. Causes of statistically significant deviations are diagnosed and corrective actions highlighted. The software application is designed to be updated dynamically so that users can effectively manage performance on the basis of current information.

1 Claim, 4 Drawing Sheets

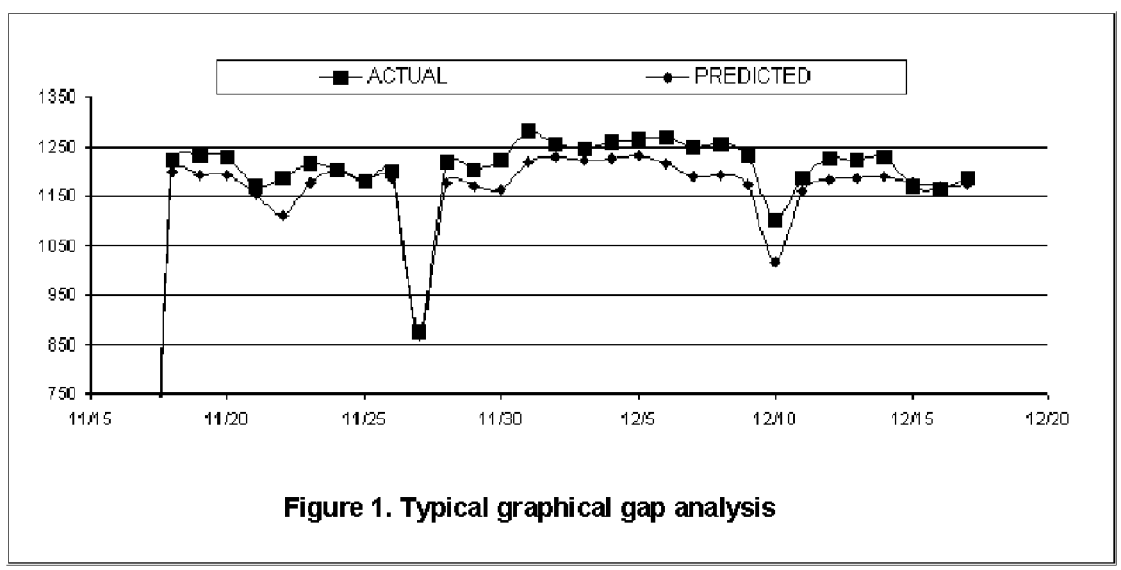
Figure 1. Typical graphical gap analysis

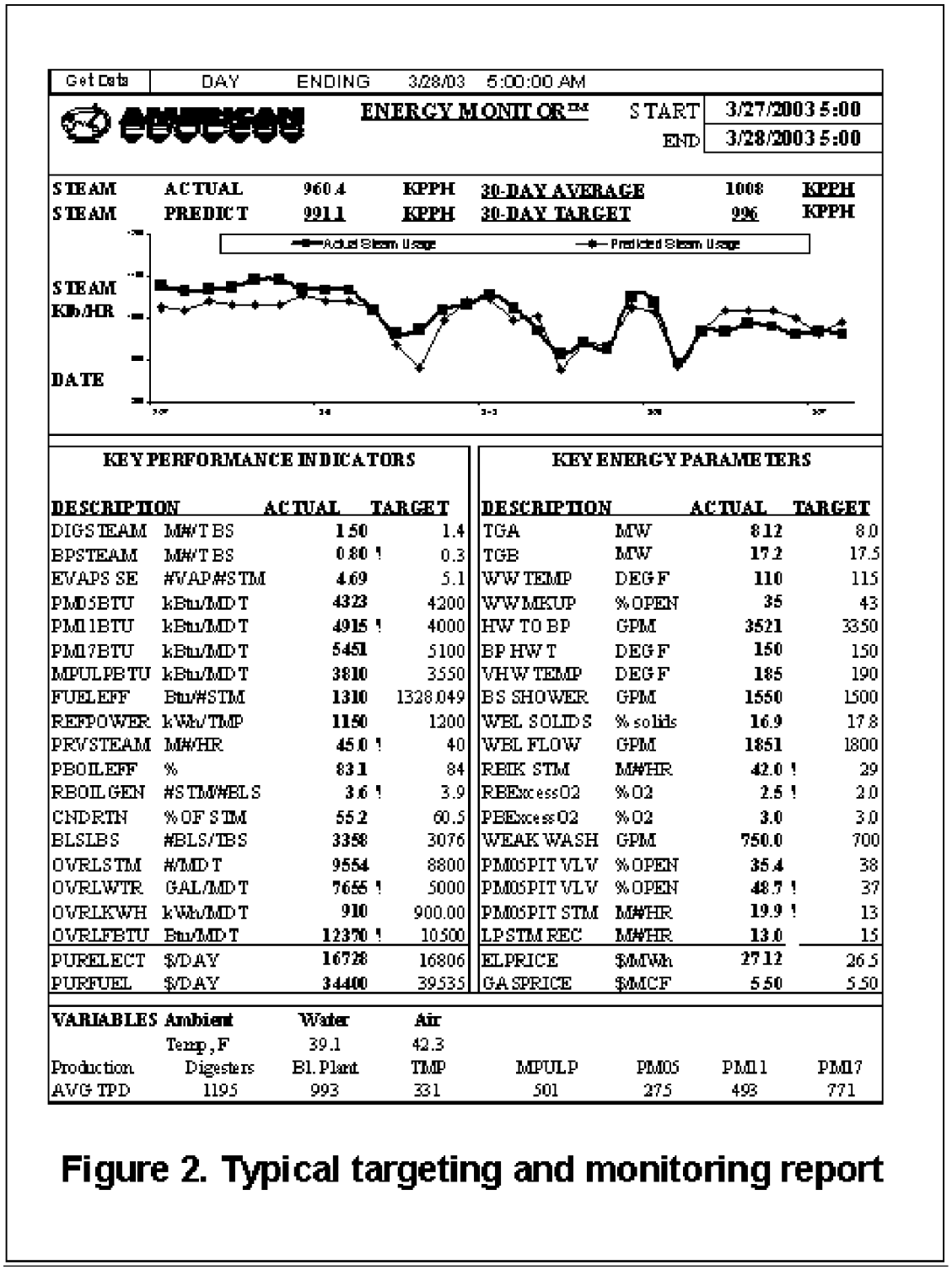
Figure 2. Typical targeting and monitoring report

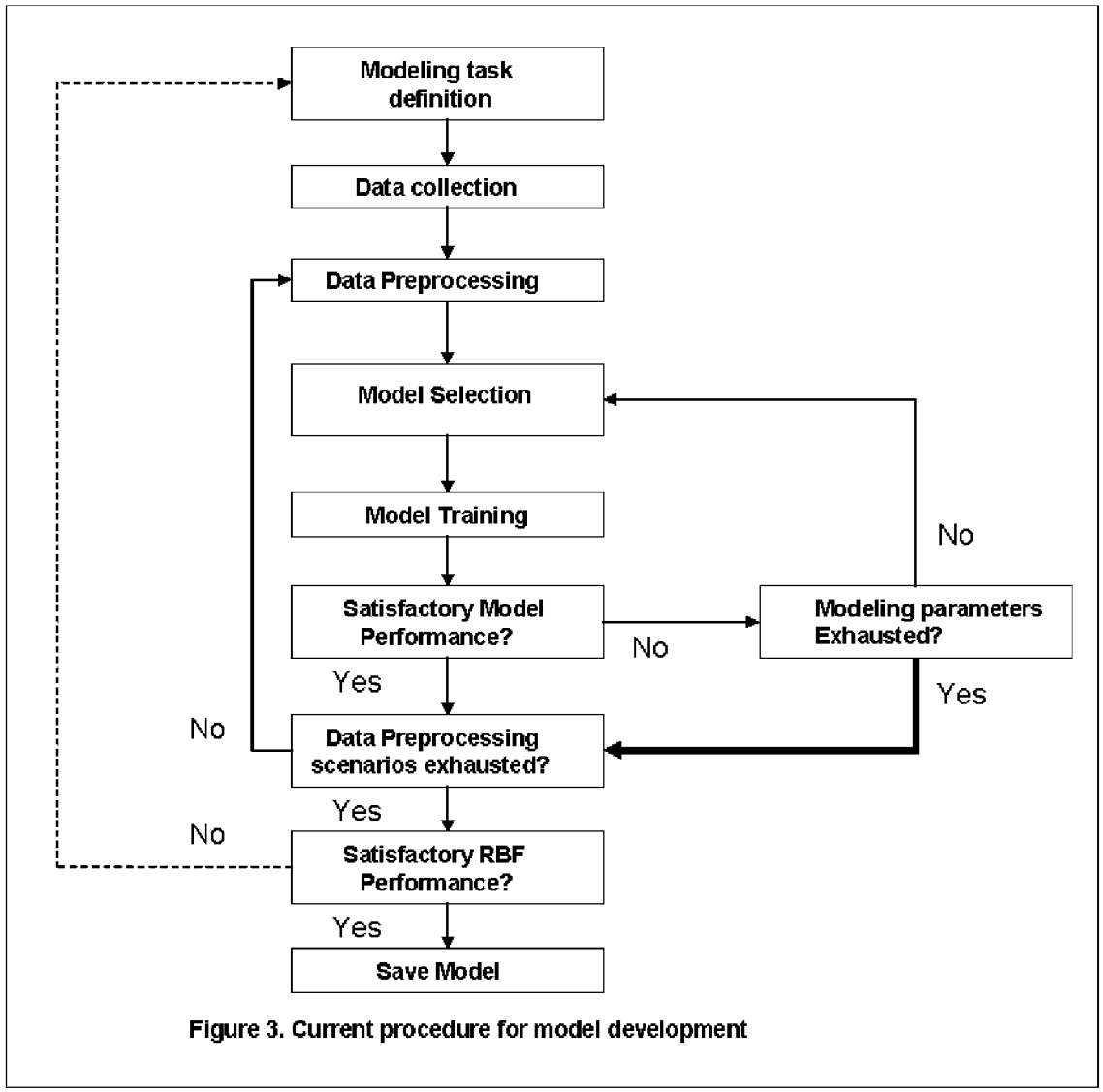
Figure 3. Current procedure for model development

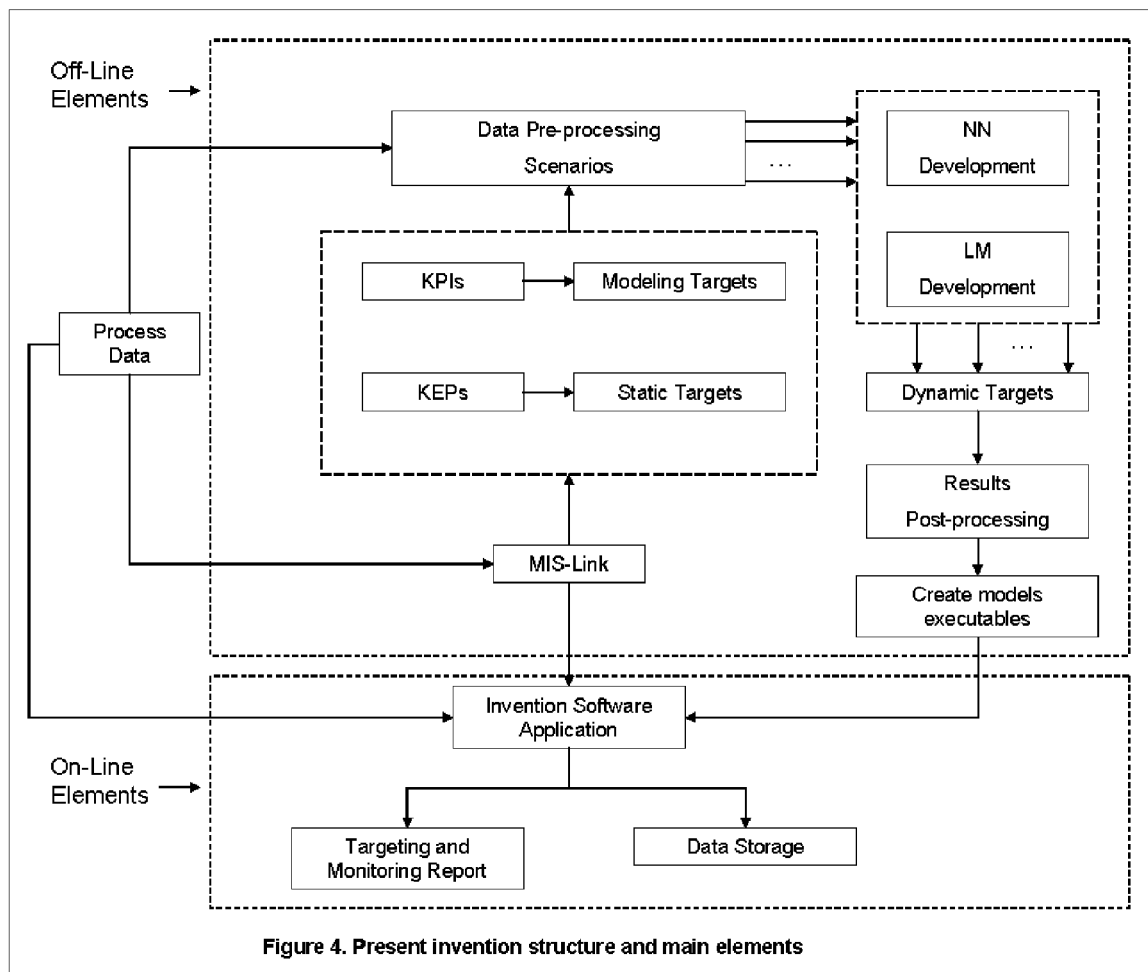
Figure 4. Present invention structure and main elements

METHOD AND SYSTEM FOR TARGETING AND MONITORING THE ENERGY PERFORMANCE OF MANUFACTURING FACILITIES

FIELD OF THE INVENTION

This invention relates to dynamic targeting and monitoring of the energy performance of manufacturing facilities using a neural network based software application, and more particularly to the on-line gap analysis reporting of energy actual performance to targets for both unit operations and for specific process parameters. It provides real-time detection of deviations from target behavior and from centerline targets, identifies the probable cause of the deviation, and highlights the current corrective actions to be taken to decrease overall energy usage and cost.

BACKGROUND OF THE INVENTION

Most manufacturing industry facilities measure energy performance against specific energy usage goals, e.g., the steam usage per unit of production. These goals fail to account for the complex inter-dependence of varying departmental production rates and the prevailing ambient conditions. Traditionally the goals are set by the facility's best performance on an ideal day or last year's average with a fixed percent target reduction. Therefore, whenever some parts of the facility are shut down or the production is slowed back or ambient conditions change, the specific performance measurement does not yield a meaningful comparison. If a process change is introduced, it is difficult to detect the facility wide impact of that change.

Creep in energy consumption is only detected long after the event, typically the first indication is in the month end accounting reports that are normally issued 1 to 4 weeks after the month closing. Most often the costs and usages in these accounting reports are assigned somewhat arbitrarily on per unit values that are many years old and subsequently adjusted to compensate for unaccounted consumption, biases for allocations, etc. Tedious analysis of the accounting reports and operating logs are required to identify the cause of the deviation. Often with these long time lags the causes cannot be identified with a reasonable level of confidence.

Accordingly a need exists for a convenient method of providing easily accessible, automatically updating, energy targeting and monitoring system of actual values versus targets derived from current department production rates and ambient conditions, with real-time indication of which control settings to change to improve energy performance.

SUMMARY OF THE INVENTION

The present invention is an automatically updating, on-line neural network based software application system that allows manufacturing facilities to meaningfully target and monitor the energy performance of their facilities, no matter how complex, with respect to the production rates and ambient conditions. It provides targets for the energy use of the overall facility, for the energy use of each significant department of a facility, and for the set points of key operating parameters that impact the facility's energy consumption and over which, the operators have control. It monitors and reports a gap comparison of the actual energy performance to updated targets and provides alerts when these are statistical significant. The report is available on-line to all connected users; it is electronically archived for future review and is exportable for electronic distribution and printing.

BRIEF DESCRIPTION OF THE DRAWINGS

A more complete understanding of the present invention may be obtained by reference to the following Detailed Description when read in conjunction with the accompanying Drawings wherein:

FIG. 1 illustrates a typical graphical gap analysis

FIG. 2 illustrates a typical targeting and monitoring report

FIG. 3 illustrates the structure of the invention in its main parts

FIG. 4 illustrates the proposed procedure for model development

DETAILED DESCRIPTION OF THE INVENTION

The present invention produces three levels of targets against which to monitor a manufacturing facility's energy performance. A unit and cost gap analysis is performed of actual vs target for overall and departmental energy performance. Causes of statistically significant deviations are diagnosed and corrective actions highlighted.

The first level target is the facility plant wide overall energy target generated by the neural network model using current production rates and ambient conditions; this is the expected "good" or "best" performance.

The present invention's neural network modeler uses multiple input data from each significant department of a manufacturing facility to model the facility's overall energy consumption; it can take multiple non-linear interactions in account. The input data can be direct production rate or, in absence of this, an indirect production rate indicator. However, it is important to exclude any indirect parameter that may mask energy inefficiencies. The ambient conditions include temperatures of outdoor air, water supply, etc. The target parameter for the model is an aggregate facility energy consumption, such as fuel, steam, or electricity consumption.

Data input for approximately 12 months data is used to develop the energy targeting neural network model. The data is split into two sets, a training set and a validation set. The training set is used by the neural network engine to generate the model and its coefficients for the prediction of energy consumption. The validation set is used by the neural network engine to confirm the model and coefficients for the prediction generated by the training data. New variables are introduced until the prediction accuracy meets statistical criteria.

The resulting non-linear coefficients are used to target the energy consumption at current conditions. These targets are compared to the actual energy consumption to perform a graphical and numerical gap analysis. A period of actual and target energy consumption is displayed in a graphical trend (FIG. 1). A continuous trend over or under the target can isolate the impact of a deliberate or unconscious process change. Statistically significant deviation between the targets and the actual energy consumption alerts that a significant process change has occurred.

The second level targets are departmental standard parameters called Key Performance Indicators (KPIs); these are derived from historical data using either a single neural network model or linear models, e.g., predicting the Btu/h steam consumption in a process department. The selection of KPIs is customized based on the facility configuration using standard definitions for each individual KPI. The KPI targets can reflect agreed upon projects, which cause change from the historical performance. The KPI targets are dynamically adjusted for current production and ambient conditions.

The third level targets are operating parameters called Key Energy Parameters (KEPs). These are direct operating parameters, such as a temperature set point or a valve position for the process equipment, that are determined to have the greatest impact to the energy consumption and that the operators have access to and can impact the KEP value through their actions. These KEPs are made available to the operators through the facility's management information system (MIS), report print outs or other agreed means.

The KEPs are determined by 'data mining' the historical data. Data mining is the selection by a process expert of all parameters that could affect the target energy usage and over which the operators have control, the creation of neural network and linear models, and the determination of the statistical significance of each of these possible parameters. Those with the most significant impact on target energy usage are retained as the KEPs.

For all types of target models, each input variable has an operating range (minimum and maximum limits). Depending on the extent of extrapolation an alert is set to inform the user about "unreliable" model targets.

For each target variable the user is able to see the deviation of the model output target value and the actual measurement. According to statistical analysis during the model development limits for accepted deviation are provided in combination with user-defined confidence level. Alternatively, users can ignore the invention's software application suggestions and set their own limits. In both cases an alarm is set, if the deviation exceeds the predefined limits.

In the present form of the invention a part of an electronic data transfer and calculations interface termed MIS Link is integrated. The MIS Link interface takes its name from the acronym Management Information System (MIS), which most manufacturing facilities have available and which records data about processes and usages of all furnish materials and energy necessary in the facility's manufacturing process. The part of MIS Link interface used in this invention is a spreadsheet file with calculations of the actual values of targets, which are not directly measured in the mill, e.g., KPI targets.

In the preferred form of the present invention, once the model parameters have been defined, and the respective targets determined, an update routine automatically downloads the current energy input data into the inventions software application via MIS link, runs the invention's software application and updates the report with the calculated values. Facilities without MIS capability enter data manually.

The calculated values are date-time stamped and stored electronically in the present invention's database; typically they are also uploaded into the facility's MIS. The daily energy report (FIG. 2) is date stamped and stored electronically on either a standalone computer, or on a server connected to the facility's intranet or LAN, where anybody with authorized access can retrieve the report. Users can also retrieve calculated values to recreate the energy report for a specific date.

The present invention's neural models belong to the radial basis function type (RBF) using a fuzzy-inspired algorithm for training. All linear models are obtained with typical regression analysis. Both types of model are static in nature capturing the mill historical performance.

Model development (data preprocessing, model parameter fitting, model evaluation and selection) takes place in the off-line part of this invention (FIG. 3). The resultant models are incorporated as dynamic link libraries (DLLs) in the present form of the invention.

The present invention includes a modeling interface between the user and the software application (FIG. 4). The models are built off-line by the user, who chooses the manufacturing facility's significant departments, sorts the KPIs per department, assigns names and models (.DLLs) to them, sorts the KEPs per department, and sets the level of alerts and the type of graphs.

The invention target parameters will have many manifestations, including water, chemicals, raw materials, etc. Furthermore the software application and database will be hosted on many platforms including the ability for an authorized user to have secure access from any computer or a device with internet browsing capability.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for real-time targeting and monitoring, performing gap analysis, identifying and diagnosing statistically significant deviations, and identifying corrective actions for the energy performance of manufacturing facilities comprising:

utilizing a customizable software application and computerized system to perform the following tasks:

develop a neural network model to generate a target for a manufacturing facility's plant wide overall energy using current production rates and ambient conditions, and develop a single neural network model or linear models to generate targets for departmental standard parameter performance indicators, dynamically adjusted for current production and ambient conditions, and identify operating parameters that are determined to have the greatest statistical significance on the department standard parameters and over which the facility's operators have control through their actions, and develop and populate a database of the software application; and enter actual energy usages and costs, department operating rates, and ambient conditions into said software application; and run the application's software to calculate target energy usages and costs, statistical analysis of deviations between actual energy usage and cost and target energy usage and cost, and perform a gap analysis of actual versus target energy usage and cost values; and diagnose the cause of statistically significant deviations and identify actions to be taken to reduce the deviations; and display calculated values on performance report of the application; and store calculated results in the application's database; and electronically export the calculated results and performance report, to production departments, a management information system, or other electronically connected destination and/or print these as hard copy reports.

* * * * *